Oct. 26, 1971   T. S. BUXTON   3,615,118
INSTALLATIONS FOR FOOD CATERING
Filed March 27, 1969   2 Sheets-Sheet 2
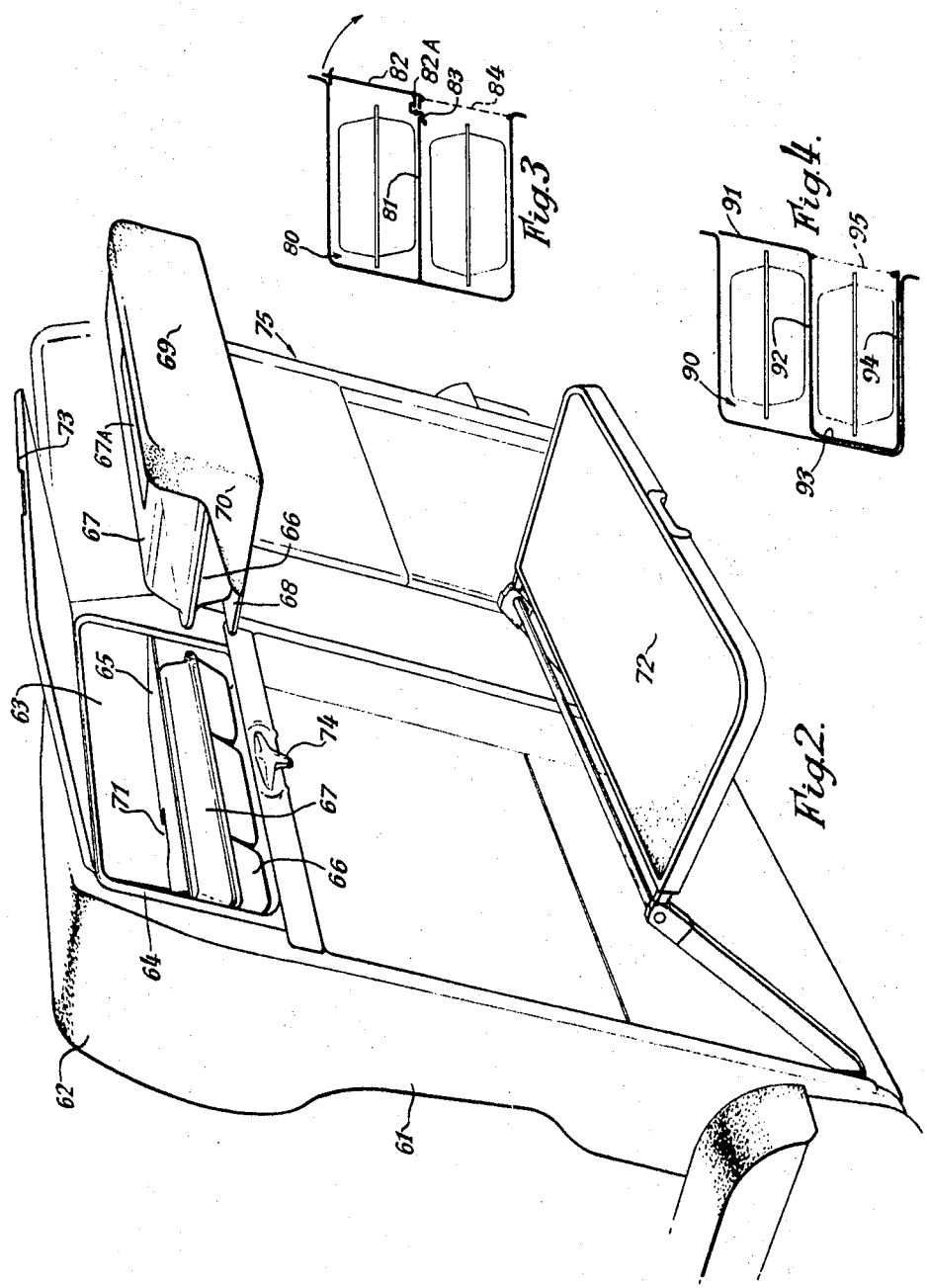

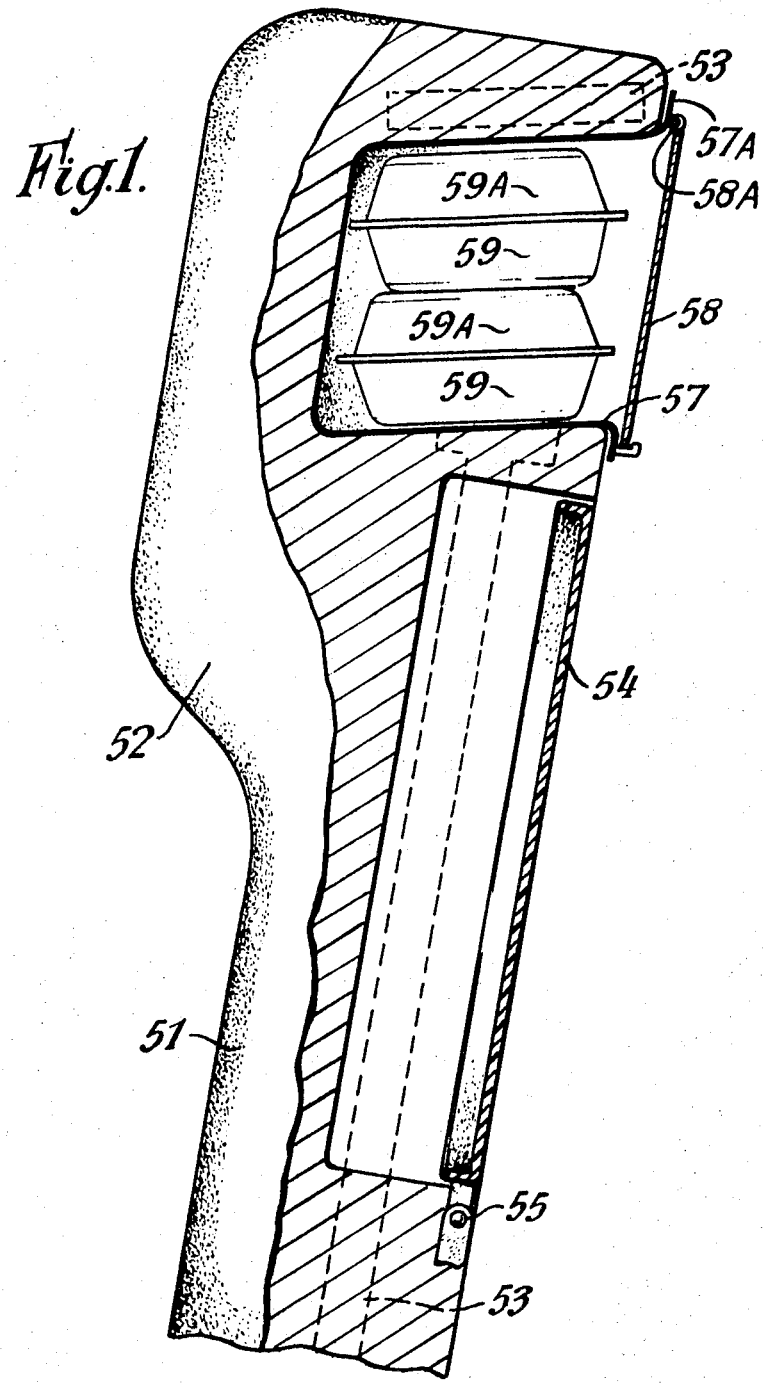

United States Patent Office 3,615,118
Patented Oct. 26, 1971

3,615,118
INSTALLATIONS FOR FOOD CATERING
Travis S. Buxton, Luton, England, assignor to Autair International Airways Limited, London, England
Filed Mar. 27, 1969, Ser. No. 811,127
Claims priority, application Great Britain, Dec. 4, 1968, 57,636/68; Mar. 3, 1969, 11,152/69
Int. Cl. A47c 7/62
U.S. Cl. 297—191
17 Claims

ABSTRACT OF THE DISCLOSURE

The invention described, concerned with the stowage and self-service of meals in vehicles, resides primarily in a vehicle seat back which has a head rest (being the upper part of the seat back and in practice usually defined by its own distinctive contour, which is of greater front-to-back thickness than the seat back proper) provided with stowage accommodation for one or more meal containers, stowed in a substantially horizontal attitude: the invention includes a vehicle equipped with seats having backs so characterised.

---

This invention is concerned with installations for food catering in vehicles. In aircraft especially, and in other passenger vehicles such as road coaches, ferry boats, etc., there are certain problems which confront the operator whose policy it is to provide a pre-packed meal for each seated passenger. Since the most exigent case from the point of view of weight and space is that of the aeroplane, especially when used on fairly short services between a base and a destination and back, this is one of the cases used as an example below; but it is to be understood that the invention is applicable to the food catering problem wherever it arises in relation to vehicular traffic. It is expected by passengers on many journeys that a meal will be provided and it is often acceptable that this be a cold meal, often called a "snack." With it there may be served a hot drink. The equipment and labour required to serve passengers individually is considerable; a so-called galley—even if it be virtually merely a food store—is of considerable weight and volume, and to dispense meals from it, especially within a short time and with cramped space, calls for the provision of more cabin staff than are otherwise required. The invention provides for a system of catering which is more or less on a self-service basis.

It is also desirable in certain types of operation, for example the quick out-and-home flights made on tourist or charter services, that the actual preparation of the meals be centralised. That is to say, that an aeroplane (for example) taking 100 passengers on a two-hour journey, and required to be turned round in the least possible time, should take out in a manner accessible to the return passengers, their meals, so that 200 meals are initially installed. Such intensive catering, although not dependent upon it, nevertheless creates a demand for entirely disposable packing and disposable utensils.

An aim of the persent invention is to provide means for the storage and dispensing of pre-packed meals in vehicles, and particularly densely occupied vehicles such as aeroplanes in which each passenger has a seat, on the basis that one or if required two meals are stored for each passenger's seat so a meal is accessible to each passenger in the first part of an out-and-home operation, and, if required, a second meal is accessible to each passenger in the second part.

The invention resides primarily in the provision in the back of a vehicle seat, and preferably in the head rest part of the back, of recessed accommodation to which access is afforded to the person occupying the next seat behind, and such accommodation is shaped and of such dimensions as to accommodate one or two metal packs, there being in the latter case means such as to make the second pack easily accessible only when the first has been removed or used.

The invention further resides in providing accommodation for one or two meal packs in the back of, and accessible from behind, a vehicle seat, in the form of a recess which has a lining of hygienic form, that is to say of material which is not attacked by anything likely to be accommodated and which has a smooth uninterrupted inner surface such as to be easily kept clean and free from food debris. Such lining may be adapted to be easily removed and may itself form part of or be specifically complementary to the meal packs themselves or one of them.

The means so provided are preferably associated with the flap table usually provided for the use of passengers, and the invention includes a simple fastener which can be so manipulated as to release the table alone, or release the table and give access to a meal.

The invention includes a vehicle having passenger seats arranged one behind another, in which the back of the other seat contains recessed accommodation for two meal packs, accessible to the occupant of the one seat.

According to one form of the invention a recess for accommodating two meal packs has a floor to receive the first pack and a drawer-like shelf to receive the second and having a front which conceals the second and also having retaining means which are concealed by, or otherwise arranged to be releasible only upon removal of, the first.

In another form, the recess is provided with a reversible drawer or slide supporting part which houses and conceals one meal pack in one of its alternative positions, and conversely the other pack in the other position.

In yet another form the two packs are accommodated one on a shelf above the other, and at least the second one is enclosed behind a door which is locked or latched so as only to be operable by an attendant; such door may close into an alternative position so as to give access to one pack whilst enclosing the other or the space previously occupied by the other.

In a simple embodiment, the packs are again accommodated one on a shelf above the other and the recesses for each pack are closed by tear-off or easily broken covers such as panels of paper or plastics sheet or film: such cover may be integrated with or adherent to the meal pack itself.

In the accompanying drawings are illustrated schematically four examples of the invention as applied to aircraft seating, of which the last three are of the same species, merely being variants in detail.

FIG. 1 illustrates the invention as applied either to a meal packaged in two containers or to two meals, in a sectional partial side elevation of a seat back.

FIG. 2 is a perspective illustration of a separately available two meal arrangement.

FIG. 3 is a simple diagrammatic section of a variant on FIG. 2.

FIG. 4 is a second simple variant on FIG. 2.

In FIG. 1, the back of the seat has the usual padded portion 51, the top of which protrudes somewhat at 52, to form a head rest. Seat structure is purely notionally indicated in broken line at 53. The usual flap table is shown at 54, hinged at 55. In the head rest part of the seat back, at 56, is formed an approximately trapezoidally shaped recess, into which fits a moulded plastics liner 57 formed with unbroken smooth internal contours to facilitate hygienic cleaning. The liner 57 may be sprung into place by being a tight fit in the embrasure of the recess 56. The recess, and margin 57A of the liner, are closed by a flap 58 hinged at 58A. The recess is so dimensioned as to accommodate (say) two food and utensil holding trays 59, each of which when loaded is preferably sealedly covered by a sprung-on cover or lid 59A. The tray and cover are preferably of thin but rigid sheet plastics of disposable quality. The trays 59 and their covers 59A are preferably so dimensioned that collectively they will fit and lodge snugly on the table 54 (which is of usual type, and will have a raised margin). Each tray 59 preferably has moulded formations such as projections and recesses, so that one will lodge without sliding about, on another; though when empty, the trays may be made so as to be readily stacked for quantity packing.

In each example, the principal components of the actual stowage are preferably made of sheet plastics material, moulded so as to present curved profiles without crevices, so that the requirements of hygiene can easily be met. In each case, the main fixture can be cleaned effectively simply by wiping.

In FIG. 2, the seat back 61, which may be adjustably tiltable, has a thickened upper portion at 62 to form a head rest. Within the thickness of the head rest, and whilst still allowing adequate padding or upholstery, is formed a cavity which is trapezoidal in shape and has an approximately rectangular rearward opening. In this opening is inserted and fixed a rigid sheet plastics locker lining moulding 63 of hollow trapezoidal form, with an external marginal flange 64 whereby the locker is secured to the structure of the head rest 62 of the seat back 61. The locker 63 is of smooth and unbroken internal form for easy cleaning, and across it at about half its height is a shelf 65, preferably easily detachable from the locker lining 63. The space below the shelf 65 is dimensioned so as to accommodate a standardised food container comprising a recessed tray 66, and complementary lid part 67. These are preferably of transparent, thin, rigid sheet plastics and the lid 67 is so formed that its margin and that of the tray 66 clip together by virtue of their general resilience. The lid 67 is high enough to accommodate a drinking vessel which stands in one of the recesses of the tray 66, and part of the rest of its plan area is depressed as at 67A (as viewed from the outside) to form a recess for utensils such as a knife, fork, and spoon. The whole assembly of tray 66, lid 67, and utensils, can be regarded as a food pack, and it is intended that it be entirely of economically disposable nature.

A second such food pack is housed in the upper part of the locker 63. In this case it is placed on a drawer slide 68 which is integral with a draw front 69 and ends 70; 68, 69 and 70 collectively are constituted by a light but rigid plastics moulding, and the slide 68 has at its forward (inner) edge, a resilient downwardly springing latch which can simply be a slitted tongue (not shown). This engages in a recess, seen at 71, in the shelf 65, and is therefore concealed and inaccessible when the lower pack is in position. When engaged, the latch holds the whole drawer, and the upper meal pack, in closed position and the upper pack is inaccessible to the passenger and, indeed, may even not be known to him to be there.

The usual hinged flap table 72 is provided. To enclose the whole food stowage locker, there is a hinged flap door 73. A three-pronged turnbutton 74 is provided, which can secure the table 72 and door 73 in one position, release the table 72 only in a second position, or release the door 73 only. At 75 is indicated a neighboring seat, since such seats are often constructed in pairs.

When the lower food pack has been used, the passenger will return it into the locker. At the destination the cabin staff will remove the empty pack, release and withdraw the upper pack and put it in the lower position, and reclose the drawer. If it is not convenient to discard the used container it can be put in the upper position. Thus the service required at a turn-round is minimised. When the cabin is fully serviced, the locker will be emptied, cleaned and replenished.

The bottom floor of the locker and the shelf 65 may be inclined slightly from the general plane of the seat back 61 so that even if the back 61 is at full inclination with the aircraft climbing, the food pack will not inadvertently slide out when the door 73 is opened.

Turning to FIG. 3, there is indicated a locker 80 as in FIG. 2, with a dividing shelf at 81 so that upper and lower packs can be stowed. A hinged door 82 normally closes the upper part, and initially either a like door or a panel of break-away transparent sheet plastics, indicated at 84, retains the lower pack. The door 82 when open, i.e. down, (its hinge axis being at 82A), can close the lower stowage space and expose the upper. Its operation is either by a key, or by releasing a catch represented at 83 which catch is accessible only when the lower stowage space is empty.

In FIG. 4 is illustrated another variant. In this, the locker 90 is again substantially as in FIG. 1. A drawer structure is provided which has a normally frontal panel 91, shelf part 92, normally rearward panel 93, and floor 94. A meal pack is placed on the shelf 92 and the drawer is inserted in the locker 90. The second pack is placed on the floor 94. At turn-round the whole drawer is removed, reversed, and re-inserted in the locker 90, making the second pack accessible. The whole locker may have a door like the door 58, or a break-away panel 95 may be provided for the first to be used (i.e. lower) pack. Again, a concealed or locked fastener may be provided to prevent reversal of the drawer until required.

It will be evident that a great many variants of detail may be employed especially as to the type of detent or lock used. Since many seats will be broad enough to afford lateral space, the locker may be made so that at one end, there is height (or front-to-back depth) to accommodate a bottle, for example of a table water or other drink.

The invention also includes provision for the storage of hot meals. When this is required or likely to be required, the recess, for example the liner 57, is lined with thermal insulation as is also the door 58 and if required the drawer, slide or shelf 65. Such lining may, for example, be a layer of foam plastics for example polyurethane in either rigid or flexible form, stuck to the outside of the locker structure, or, insulation in the nature of reflective and cellularly formed aluminium foil with or without laminae of plastics sheet, may be used. Then each pack having been preheated, is stowed in the locker (which is tightly closed with perhaps some very small air leakage to avoid adverse cabin-pressure effects) and will remain hot. In cases in which the circuitry in a vehicle lends itself to such elaboration, each locker may include a small electrical heater, for example a resistance heater mat of conductive rubber.

I claim:
1. A seat back for a vehicle seat, comprising:
means providing a food stowage compartment including an opening facing and accessible to a passenger in a seat behind said vehicle seat, said compartment having an internal wall, including a bottom wall, which is smoothly contoured to provide a readily cleanable inner surface, and being so dimensioned and arranged as to accommodate therewithin at least one meal container in a substantially horizontal position; and
a flap table supported on the back wall of said vehicle seat back having a first upright position conforming with said back wall and a second horizontal position extending from said back wall, the upper edge of said flap table, when in said upright position, being located below said bottom wall of said compartment permitting access to said compartment when in said upright position, said table being so dimensioned that said container will fit thereon in said horizontal position after removal from said compartment.

2. A seat back according to claim 1, in which said compartment is so dimensioned and arranged as to accommodate two of said containers in a substantially horizontal position.

3. A seat back according to claim 2, further provided with closure means to enclose said compartment and provide separate access to said containers.

4. A seat back according to claim 3, in which the closure means are such that only one of said containers is accessible at a time.

5. A seat back according to claim 2, wherein said compartment comprises a drawer structure having a horizontal shelf dividing said compartment into an upper and a lower half-compartment, a vertically extending front panel closing one of said half-compartments and a vertically extending rear panel adjacent the back wall of the other of said compartments, said structure being reversible to place said front panel adjacent said back wall and said rear panel to close the other of said half-compartments.

6. A seat back according to claim 1 in which thermal insulation is provided to prevent heat exchange to and from the container when in the compartment.

7. A seat back according to claim 1, wherein at least one of said meal containers is received within said stowage compartment.

8. A seat back according to claim 7, wherein two of said meal containers are received within said stowage compartment.

9. A seat back according to claim 7, wherein said flap table comprises an upstanding rim and said meal container is dimensioned to fit and lodge snugly on said table.

10. A seat back according to claim 1, wherein said internal wall is formed as a removable liner having smooth unbroken internal contours, said liner being sprung into said compartment.

11. A seat back according to claim 1, further comprising a closure closing said compartment, said closure being hinged at the top of said compartment and said flap table being hinged at its lower edge.

12. A seat back according to claim 11, further comprising common securing means for securing said closure and said table in one position, releasing the table only in a second position and releasing the closure only in a third position.

13. A seat back according to claim 2, further comprising a shelf in the said compartment separating an upper from a lower half-compartment each to accommodate one of the containers, one such half-compartment having an access door and the door having a locking device so positioned as to be accessible only by way of the other half-compartment when no container occupies such other half-compartment.

14. A seat back according to claim 13, in which at least one of the containers is housed in a slidable drawer which fits into the compartment, the visible end of the drawer constituting said access door and the whole drawer being lockable by said locking device.

15. A seat back according to claim 14, in which said drawer is reversible as to its position in the compartment.

16. A seat back according to claim 2, in which the whole compartment and both containers when stowed therein are accessible through one door.

17. A vehicle seat structure, comprising:
means providing a food stowage compartment including an opening facing and accessible to a passenger in a seat behind said vehicle seat, said compartment having an internal wall which is smoothly contoured to provide a readily cleanable inner surface and being so dimensioned and arranged as to accommodate therewithin at least one meal container; and closure means operable for opening and closing said compartment.

References Cited

UNITED STATES PATENTS

| | | | |
|---|---|---|---|
| 2,025,393 | 12/1935 | Kupfer | 297—191 |
| 2,349,766 | 5/1944 | Simjian | 297—191 |
| 3,049,374 | 8/1962 | Nance | 297—146 |
| 3,449,011 | 6/1969 | Edwards et al. | 297—391 |

FOREIGN PATENTS

| | | | |
|---|---|---|---|
| 1,215,924 | 11/1959 | France | 297—191 |
| 1,541,412 | 8/1968 | France | 297—191 |

JAMES T. McCALL, Primary Examiner

U.S. Cl. X.R.

297—163

UNITED STATES PATENT OFFICE
CERTIFICATE OF CORRECTION

Patent No. 3,615,118                    Dated   October 26, 1971

Inventor(s)  TRAVIS STARR BUXTON

It is certified that error appears in the above-identified patent and that said Letters Patent are hereby corrected as shown below:

The name of the assignee is changed to read --

Court Line Aviation Limited --.

Signed and sealed this 21st day of March 1972.

(SEAL)
Attest:

EDWARD M. FLETCHER, JR.          ROBERT GOTTSCHALK
Attesting Officer                Commissioner of Patents